United States Patent [19]
Kuroiwa et al.

[11] Patent Number: 4,692,855
[45] Date of Patent: Sep. 8, 1987

[54] CONSTANT VOLTAGE AND FREQUENCY TYPE PWM INVERTER WITH MINIMUM OUTPUT DISTORTION

[75] Inventors: Akihiko Kuroiwa, Fuchu; Suzuo Saito, Higashimurayama, both of Japan

[73] Assignee: Kabushiki Kaisha Toshiba, Kanagawa, Japan

[21] Appl. No.: 903,472

[22] Filed: Sep. 4, 1986

[30] Foreign Application Priority Data

Sep. 9, 1985 [JP] Japan .................................. 60-197572
Jan. 29, 1986 [JP] Japan .................................. 61-17364

[51] Int. Cl.$^4$ .............................................. H02M 7/44
[52] U.S. Cl. .......................................... 363/95; 363/41; 363/131
[58] Field of Search ...................... 363/40, 41, 95, 131

[56] References Cited
U.S. PATENT DOCUMENTS 3,781,634 12/1973 Jesseee .................................. 363/41
4,489,371 12/1984 Kernick .................................. 363/41

Primary Examiner—Patrick R. Salce
Assistant Examiner—Jeffrey Sterrett
Attorney, Agent, or Firm—Schwartz, Jeffery, Schwaab, Mack, Blumenthal & Evans

[57] ABSTRACT

Imprementation is presented with a view to eliminating waveform distortion in an ac power supply device using a voltage type inverter. To realize this, there is provided a control system to detect a current flowing through a capacitor for absorbing higher harmonics provided along with a smoothing reactor between the voltage type inverter and a load to compare the current detector with a sine wave reference to control the voltage type inverter by making use of the compared result. To this control system, a correction control system for follow-up control of the output voltage of the ac power supply device may be added. The correction control system is configured to detect an output voltage of the ac power supply device which lags the capacitor current by a phase angle of 90 degrees to compare the output voltage detected with another sine wave which lags the sine wave reference by a phase angle of 90 degrees to use the compared result as a voltage control signal.

6 Claims, 4 Drawing Figures

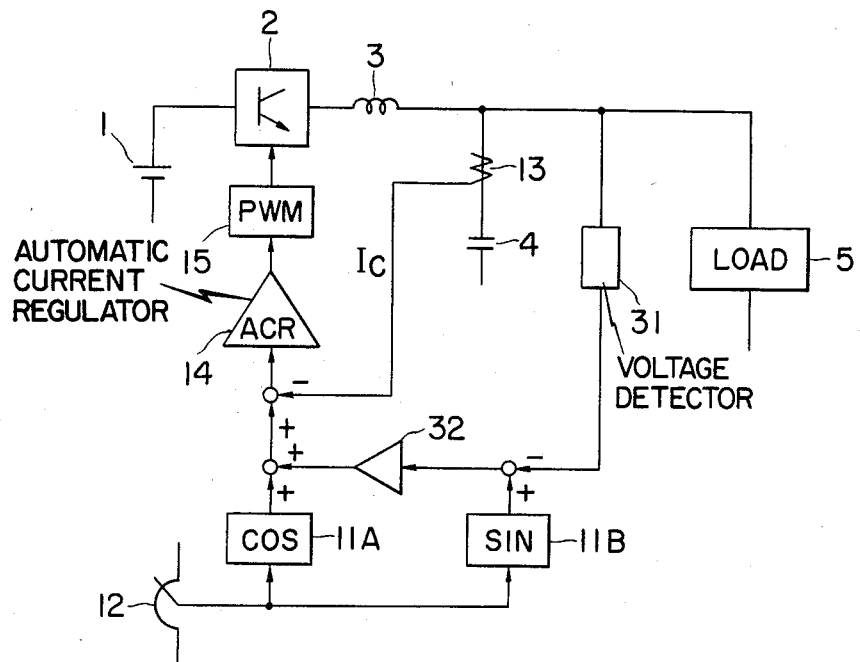
F I G. 3
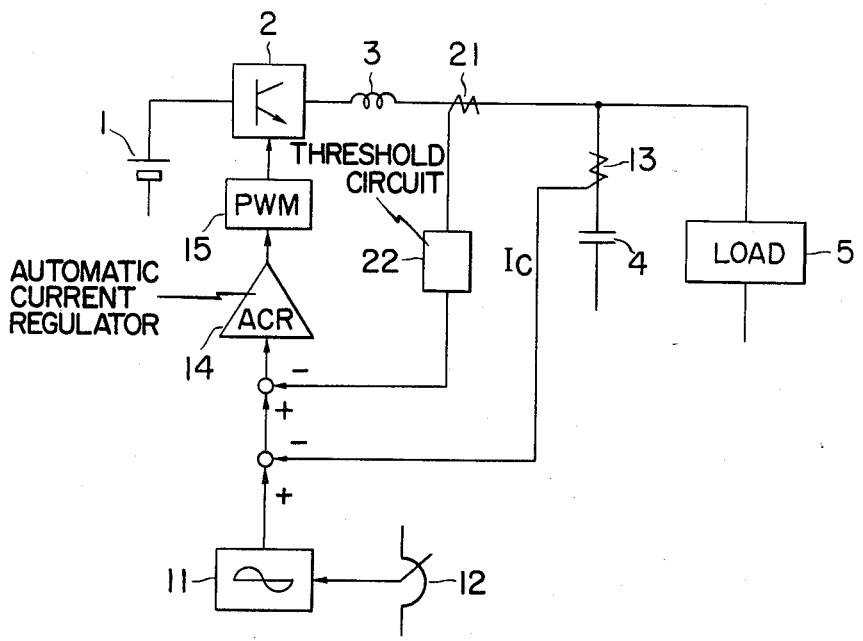
F I G. 4

CONSTANT VOLTAGE AND FREQUENCY TYPE PWM INVERTER WITH MINIMUM OUTPUT DISTORTION

BACKGROUND OF THE INVENTION

1. Field of the Invention

The present invention relates to an ac power supply device.

2. Prior Art

Power supply devices using the voltage type PWM inverter have been known in the art as e.g. Constant Voltage Constant Frequency (CVCF) type power supply device. With such devices, the inverter effects on/off operation of a dc voltage delivered from a dc power supply, thereby to generate an output voltage which is pulse width-modulated in a sinusoidal form. Since this output voltage includes a large number of higher harmonics, a smoothing reactor and a capacitior for absorbing higher harmonics connected to the output of the inverter are used to improve the waveform of the output voltage to deliver an output to a load as a sine wave voltage.

On the other hand, the output voltage is electrically insulated by a transformer and the amplitude of a secondary output of the transformer is detected by a rectifier. The amplitude thus detected as well as a voltage reference is delivered to a voltage controller and the both values are subjected to comparative control. In accordance with an output of the voltage controller, a pattern PWM signal generator generates a PWM signal sinusoidally modulated to carry out on/off control of the inverter.

However, since the above-mentioned conventional system is adapted so that on/off signal is controlled by feedback of a rectified output voltage without controlling instantaneous value of the output voltage, only the amplitude of the output voltage can be controlled, with the result that waveform distortion cannot be controlled. Accordingly, it is difficult to obtain a sine wave output voltage having less waveform distortion. A further drawback with this system is that output waveform varies depending upon the load. This is problem when particularly non-linear load such as rectifier load is connected. The waveform distortion of the output voltage has bad influence on a load such as an electronic computer connected to the output.

For this reason, a filter is used to eliminate waveform distortion. By increasing the number of stages of the filter, waveform distortion can be desirably eliminated accordingly.

However, when a number of filters are inserted, the total time constant of the power supply device becomes large, thus failing to realize high response control.

In view of this, there has been proposed a system to effect control of instantaneous value of the output voltage. According to this system, an output voltage detected is compared with a sine wave reference with the output voltage being in the form of ac to realize instantaneous value control.

Namely, the output voltage of the inverter device is detected by a transformer and the output voltage thus detected as well as a sine wave reference undergoes comparative control in the voltage controller with the output voltage being in the condition of ac signal. The output of the voltage controller becomes an output current reference of the inverter. The output current reference and an output current detected by a current transformer are subjected to comparative control. In accordance with an output of the current controller, the PWM signal generator controls on/off operation of the inverter.

There is proposed another method to effect voltage control at dc level on the basis of rectified signal of the output voltage to obtain a sine wave signal having an amplitude reference as the output thereby to control an output current of the inverter. With this method, the output current becomes sinusoidal, but an output voltage depends upon load. For this reason, particularly in the case of non-linear load such as rectifier load, the output current does not become sinusoidal. Accordingly, it is necessary to effect comparative control of the output voltage using ac signal.

When an instantaneous value of the output ac voltage is thus controlled, the output ac voltage varies by a phase angle of 180 degrees at a frequency more than resonant frequency by reactor and capacitor on the output side. As a result, this causes oscillation, resulting in unstable control. Accordingly, it is unable to improve response of the control system e.g. to cause the gain of the amplifier to be high, giving rise to the problem that the output voltage is distorted with respect to the sine wave reference. An attempt to increase the resonant frequency results in a decrease in the filter constant (L and C), thus making it difficult to suppress higher harmonics.

SUMMARY OF THE INVENTION

An object of the present invention is to provide a CVCF type power supply device constituted with a voltage type PWM inverter characterized in that the power supply device can effect follow-up control of the output voltage in a stabilized manner with respect to a sine wave reference for minimizing distortion of the output voltage waveform.

According to the present invention, this object is achieved by comparing a current of a capacitor connected to the output of a CVCF type power supply device constituted with the voltage type PWM inverter with a sine wave reference to effect follow-up control by using a compared result to control the output voltage waveform, and to vary the amplitude of the current reference of the capacitor thereby to control the magnitude of the output voltage.

BRIEF DESCRIPTION OF THE DRAWINGS

In the drawings:

FIG. 3 is a circuit diagram illustrating a third embodiment of the invention; and FIG. 4 is a circuit diagram illustrating a fourth embodiment of the invention.

DETAILED DESCRIPTION OF PREFERRED EMBODIMENTS

The present invention will be described in detail in connection with preferred embodiments with reference to attached drawings.

Figure 1:
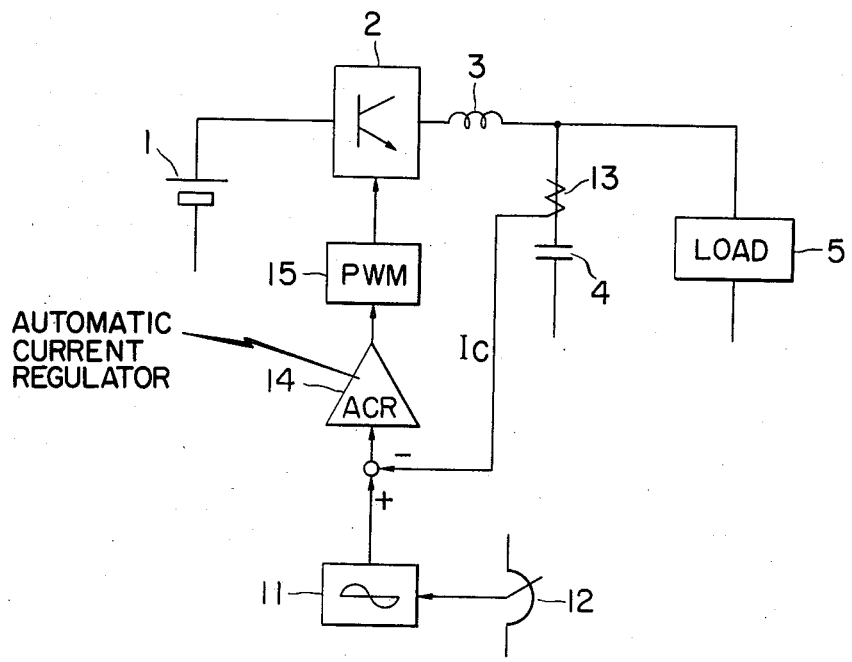
FIG. 1 is a circuit diagram illustrating a first embodiment of the invention.

Initially, referring to FIG. 1, there is shown a first embodiment of an ac power supply device according to the present invention. The ac power supply device in this embodiment comprises a dc power supply 1, a PWM control inverter 2 connected to the dc power supply 1, a smoothing reactor 3 connected to the output of the inverter 2, a capacitor 4 for absorbing higher harmonic current of the output of the inverter 2, and a load 5. These circuit components 1 to 5 constitute a main circuit.

In the main circuit, a compared result of an output of a sine wave oscillator 11 with a current detected of a current transformer 13 is delivered to the inverter 2 through a current controller 14 and a PWM signal generator 15. In accordance with the compared result, the control operation of the inverter 2 is carried out.

The sine wave oscillator 11 produces an output for determining the output waveform of the inverter 2 and the amplitude thereof is determined by a set value of a voltage reference 12. In addition, a sine wave signal corresponding to a current Ic flowing in the capacitor 4 is obtained as the output of the current transformer 13. Accordingly, the inverter 2 receives the sine wave control signal to operate so as to produce a sine wave output.

The operation of the first embodiment shown in FIG. 1 will be now described.

The sine wave oscillator 11 produces a sine wave signal having a predetermined frequency with the voltage reference 12 providing the amplitude reference. This sine wave signal serves as an instantaneous value corrected capacitor current reference of the capacitor 4. The automatic current regulator 14 responds to an output indicative of a comparison between the capacitor current signal from the current detector 13 and the corrected capacitor current reference to drive the PWM control circuit 15 to effect follow-up control so that an ac current of the capacitor 4 is equal to the corrected capacitor current reference. In response to the output of the current controller 14, the PWM signal generator 15 allows the inverter 2 to effect on/off operation.

When settings are made such that C represents a capacity of the capacitor, Ic a current flowing therethrough, Vo an output voltage and f an output frequency, the capacitor current Ic is expressed as follows.

$$Ic = 2\pi f C Vo \quad (1)$$

Accordingly, by effecting follow-up control such that the waveform of the capacitor current Ic becomes sinusoidal, the output voltage Vo also becomes sinusoidal. In addition, by allowing the voltage reference 12 to be adjustable, the amplitude of the capacitor current reference is changed, thus making it possible to vary the amplitude of the output voltage.

On the other hand, since the equation (1) does not include the parameter indicative of load, it is apparent that it is possible to conduct a control such that the output voltage is maintained to have an excellent sine wave having less distortion even with respect to the rectifier load or changes in load.

In addition, a transformer may be used for step-up or step-down of the output voltage or insulation instead of the smoothing reactor 3. It is apparent that utilization of leakage impedance of such a transformer as smoothing reactor is not contrary to the subject matter of the present invention.

As is clear from the foregoing description in connection with the first embodiment, the CVCF type power supply device constituted with the voltage type PWM inverter is configured to compare a current flowing through the capacitor connected to the output with a sine wave reference to effect follow-up control by using the compared result, thereby making it possible to effect a control such that the output voltage has a sinusoidal waveform thus to provide an excellent sine wave output having less waveform distortion.

In addition, the power supply device in this embodiment can suppress waveform distortion even with respect to the non-linear load or variations in load to maintain an excellent sine wave output.

Figure 2:
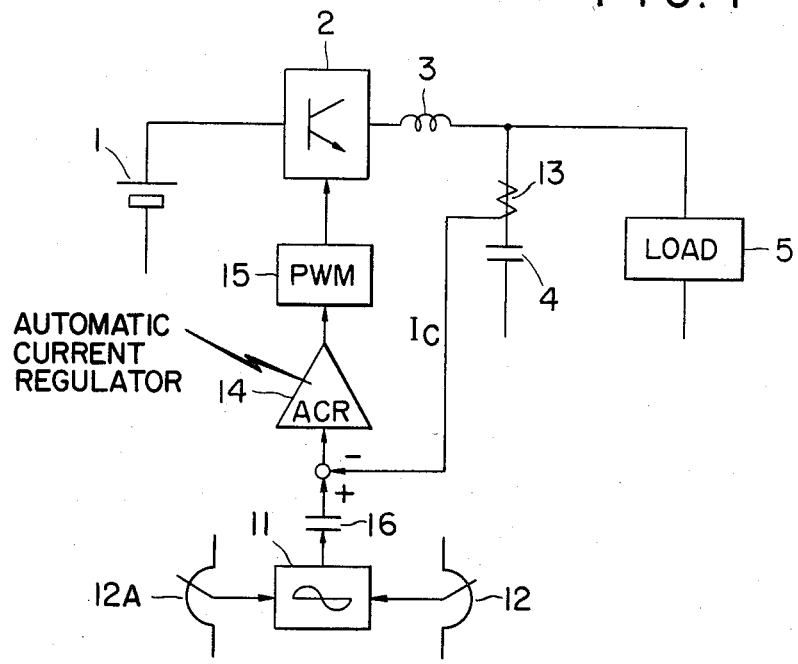
FIG. 2 is a circuit diagram illustrating a second embodiment of the invention.

A second embodiment of the present invention will be described with reference to FIG. 2.

CVCF type power supply device shown in this figure has a function to change frequency e.g. 50/60 Hz within a certain range. The embodiment shown in FIG. 2 differs from the first embodiment shown in FIG. 1 in that frequency reference 12A and an ac coupling capacitor 16 are newly added.

Since the operation of this embodiment is similar to that of the first-mentioned embodiment in whole, only the operation in connection with the different point will be referred to here.

The inverter output frequency in this embodiment is not fixed, but is adjustable by the frequency reference 12A. Accordingly, for maintaining the output voltage Vo constant with respect to changes in the frequency f in the above-mentioned eq. (1), it is required that the capacitor current Ic becomes in proportion to the frequency f. In this embodiment, the ac coupling capacitor 16 is used to cut off a dc signal, enabling the amplitude of the capacitor current reference Ic to become in proportion to the frequency f.

Although this embodiment differs from the first embodiment shown in FIG. 1 in that frequency is adjustable, but is the same as the first embodiment in that follow-up control is carried out so that the capacitor current of the inverter output is equal to the sine wave reference. This is not contrary to the subject matter of the present invention.

A third embodiment of the present invention will be described with reference to FIG. 3. Parts designated by the same reference numerals in FIG. 3 as those in FIGS. 1 and 2 represent corresponding circuit components, respectively. This embodiment differs from the embodiments shown in FIGS. 1 and 2 in that there are newly added a voltage detector 31 for detecting an output voltage, a sine wave oscillator (which will be called a "first sine wave oscillator" hereinafter) 11A, a second sine wave oscillator 11B, and a voltage control circuit 32 responsive to a deviation between outputs of the voltage detector 31 and the second sine wave oscillator 11B to correct an output of the first sine wave oscillator 11A.

The operation of this embodiment will be described. The first sine wave oscillator 11A produces a first sine wave reference signal having a predetermined frequency serving as the capacitor current reference with an output of the amplitude setter 12 being as the amplitude reference. Similarly, with the output of the amplitude setter 12 being as the amplitude reference, the second sine wave oscillator 11B produces a second sine wave current reference which lags the capacitor current reference by a phase angle of 90 degrees. This second sine wave reference signal serves as an instantaneous value reference of the output voltage. The voltage control circuit 32 responds to a comparison between an output voltage signal from the voltage detector 31 and an output voltage reference from the second sine wave oscillator 11B to compute amount to be corrected of the capacitor current necessary for allowing the both signals to be equal to zero. The output of the voltage control circuit 32 is added to the capacitor current reference output from the first sine wave oscillator 11A. Namely, the capacitor current reference is corrected in a manner that the output voltage deviation is equal to zero. The current control circuit 14 responds to an output indicative of comparison between the capacitor current signal from the current detector 13 and the corrected capacitor current reference to drive the PWM control circuit 15 to effect follow-up control so that an ac current of the capacitor 4 is equal to the corrected capacitor current reference.

In the steady state, the output voltage waveform and the output voltage reference waveform are substantially completely identical to each other and therefore a small quantity to be corrected is only added to the capacitor current reference. On the other hand, in the event that a low frequency output voltage deviation particularly that of dc component occurs by changes in load, a quantity to be corrected corresponding to the deviation value is added to the capacitor current reference, thus to effect a control such that the output voltage deviation is equal to zero.

As stated above, the ac power supply device in this embodiment is provided with the voltage control system for directly feeding back the output voltage to control it within the capacitor current control system to effect follow-up control of a current flowing through the capacitor 4 connected to the output terminal thereby to effect a control such that the output voltage has a sinusoidal waveform. This embodiment is characterized in that an attention is drawn to the fact that phase difference between current and voltage of the capacitor 4 is maintained at a phase angle of 90 degrees to employ the sine wave signal which lags the capacitor current reference by a phase angle of 90 degrees as the output voltage reference, thereby making it possible to effect follow-up control of the output voltage. As a result, while maintaining the advantage with the capacitor current control system in which stable control is carried out at a frequency more than the resonant frequency determined by the reactor 3 and the capacitor 4, the ac power supply device in this embodiment has solved the problem of suppression of the low frequency vibration of the output voltage due to disturbance etc. which has been difficult only with the capacitor current control system, thus making it possible to provide an excellent sine wave output voltage having less waveform distortion in a stabilized manner.

It is apparent that the present invention can be applied with the same configuration as in the above-described third embodiment in the circuit configuration where a transformer is used instead of the smoothing reactor 3 for step-up or step-down of the output voltage or insulation to use leakage impedance of the transformer as the smoothing reactor. Although the single-phase circuit has been described in the above-mentioned embodiment, it is also needless to say that the present invention can be applied with the same configuration in the three-phase circuit.

A fourth embodiment of the present invention will be described with reference to FIG. 4. This embodiment is configured to detect an overcurrent in the main circuit to suppress the output of the inverter on the basis of the overcurrent detected.

To realize this, a current transformer 21 is provided at a portion where changes in load current in the main circuit can be detected to deliver an output signal of the current transformer 21 to the input terminal of the current control circuit 14 through a threshold circuit 22. This output signal is delivered to the inverter control circuitry (14, 15) so as to have a polarity such that the current control circuit 14 suppresses the output of the inverter.

With this circuit arrangement, when a current flowing through the main circuit is above set threshold level of the threshold circuit 22, the current control circuit 14 operates so as to suppress the output of the inverter 2. Thus, this embodiment can take countermeasure for overcurrent.

ADVANTAGES WITH THE INVENTION

As is clear from the foregoing description, the CVCF type power supply device constituted with the voltage type PWM inverter is characterized in that follow-up control is carried out so that a current flowing through the capacitor connected to the output is equal to the sine wave reference, thus making it possible to advantageously effect a control such that the output voltage has a sinusoidal waveform. The capacitor current shifts by a phase angle of 90 degrees, but even when passed through a control system using high gain amplifier, it does not reach shift of a phase angle of 360 degrees which is oscillation state. Accordingly, an excellent sine wave output having less waveform distortion can be obtained. In addition, it is also possible to advantageously effect a control to suppress wave distortion with respect to non-linear load or changes in load to maintain an excellent sine wave output voltage. As a result, higher harmonics of a frequency less than the switching frequency of the inverter are removed from the output voltage and it is easy to eliminate higher harmonics of frequency components, which are more than the switching frequency, of relatively high frequency by using a small-sized filter. Thus, this can prevent the higher harmonics from having bad influence on loads such as electronic computer etc.

What is claimed is:

1. An ac power supply device comprising:
   a voltage type inverter;
   a reactor and a capacitor connected to the output of said inverter;
   a circuit for generating a sine wave reference signal;
   means for detecting a current flowing through said capacitor; and
   means responsive to said sine wave reference signal and said current flowing through said capacitor to control said voltage type inverter in accordance with a compared result thereof.

2. An ac power supply device as set forth in claim 1, wherein said circuit for generating said sine wave reference signal is additionally provided with amplitude adjustment means.

3. An ac power supply device as set forth in claim 1, wherein said circuit for generating said sine wave reference signal is additionally provided with frequency adjustment means.

4. An ac power supply device as set forth in claim 1, which further comprises means for detecting an output current of said ac power supply device and means for producing a current suppression signal when an output of said detection means is above a threshold level, thus to suppress said output current of said voltage type inverter in accordance with said current suppression signal.

5. An ac power supply device comprising:
a voltage type inverter;
a smoothing reactor and a capacitor for absorbing higher harmonics connected to an output terminal of said inverter;
means for detecting an output voltage of said power supply device;
means for detecting a current flowing through said capacitor;
a circuit for generating a first sine wave reference signal as a capacitor current reference;
a circuit for generating a second sine wave reference signal, as an output voltage reference, 90 degrees out of phase with said first sine wave reference signal;
means for correcting a value of said first sine wave reference signal on the basis of comparison between outputs of said second sine wave generator circuit and said output voltage detector means; and
means for effecting follow-up control of the operation of said inverter so that an output of said current detector means is equal to said first sine wave reference signal.

6. An ac power supply device as set forth in claim 5, wherein said first and second circuits for generating said sine wave reference signals are provided with amplitude adjustment means to control the amplitudes of said first and second sine wave reference signals.

* * * * *